United States Patent [19]

Käuferle, deceased et al.

[11] 4,356,614

[45] Nov. 2, 1982

[54] METHOD FOR THE PRODUCTION OF COMPOUND PLATES, PARTICULARLY COMPOUND GLASS PANES

[75] Inventors: Josef Käuferle, deceased, late of Aichach, Fed. Rep. of Germany, by Viktoria Käuferle, heiress and legal representative; Werner Lutzke, Friedberg, Fed. Rep. of Germany

[73] Assignee: Josef Käuferle KG Stahlbau, Aichach, Fed. Rep. of Germany

[21] Appl. No.: 120,919

[22] Filed: Feb. 12, 1980

[30] Foreign Application Priority Data

Feb. 15, 1979 [DE] Fed. Rep. of Germany ....... 2905841

[51] Int. Cl.$^3$ ........................ B23P 15/00; B21D 35/00

[52] U.S. Cl. ................................ 29/469.5; 29/455 R; 29/428; 156/109; 52/658; 52/788

[58] Field of Search .......... 29/469.5, 455 R, 455 LM, 29/462, 428; 52/172, 658, 788, 398; 156/109; 428/34; 72/335, 293

[56] References Cited

U.S. PATENT DOCUMENTS

| | | | |
|---|---|---|---|
| 2,006,925 | 7/1935 | Klemp | 72/335 |
| 2,880,475 | 4/1959 | Mills | 29/455 R |
| 3,380,145 | 4/1968 | Stroud et al. | 29/455 R |
| 3,473,988 | 10/1969 | Rullier et al. | 156/109 |
| 3,568,300 | 3/1971 | Zidell | 72/319 |
| 4,261,145 | 4/1981 | Bröcking | 29/428 |

FOREIGN PATENT DOCUMENTS

| | | | |
|---|---|---|---|
| 635249 | 1/1962 | Canada | 156/109 |
| 1041510 | 9/1966 | United Kingdom | 29/455 R |
| 1159001 | 7/1969 | United Kingdom | 29/469.5 |
| 1227943 | 4/1971 | United Kingdom | 29/469.5 |
| 1307843 | 2/1973 | United Kingdom | 29/455 R |
| 1345238 | 1/1974 | United Kingdom | 29/455 R |

*Primary Examiner*—Daniel C. Crane
*Attorney, Agent, or Firm*—Toren, McGeady & Stanger

[57] ABSTRACT

In producing compound plates, such as compound glass panes, two individual plates are held in opposed spaced parallel relation with a frame located between them and extending along the edges of the plates so that the frame connects the plates together. In assembling the compound plates, the frame is formed by removing a flat strip from a supply source and conveying it to a bending station. While the strip is moved to the bending station or in the bending station a number of miter cuts are formed spaced apart in the long direction of the strip so that the miter cuts separate the strip into connected subsections. The miter cuts are located to correspond to the intersecting edges of the plates. The strip is bent or folded along lines extending in its long direction into a hollow section. Subsequently, the hollow section is formed into a frame by bending the connected subsections at the miter cuts. The trailing end of the trailing subsection of the hollow section is separated from the following hollow section before the completion of the frame.

5 Claims, 8 Drawing Figures

Figure 1B:
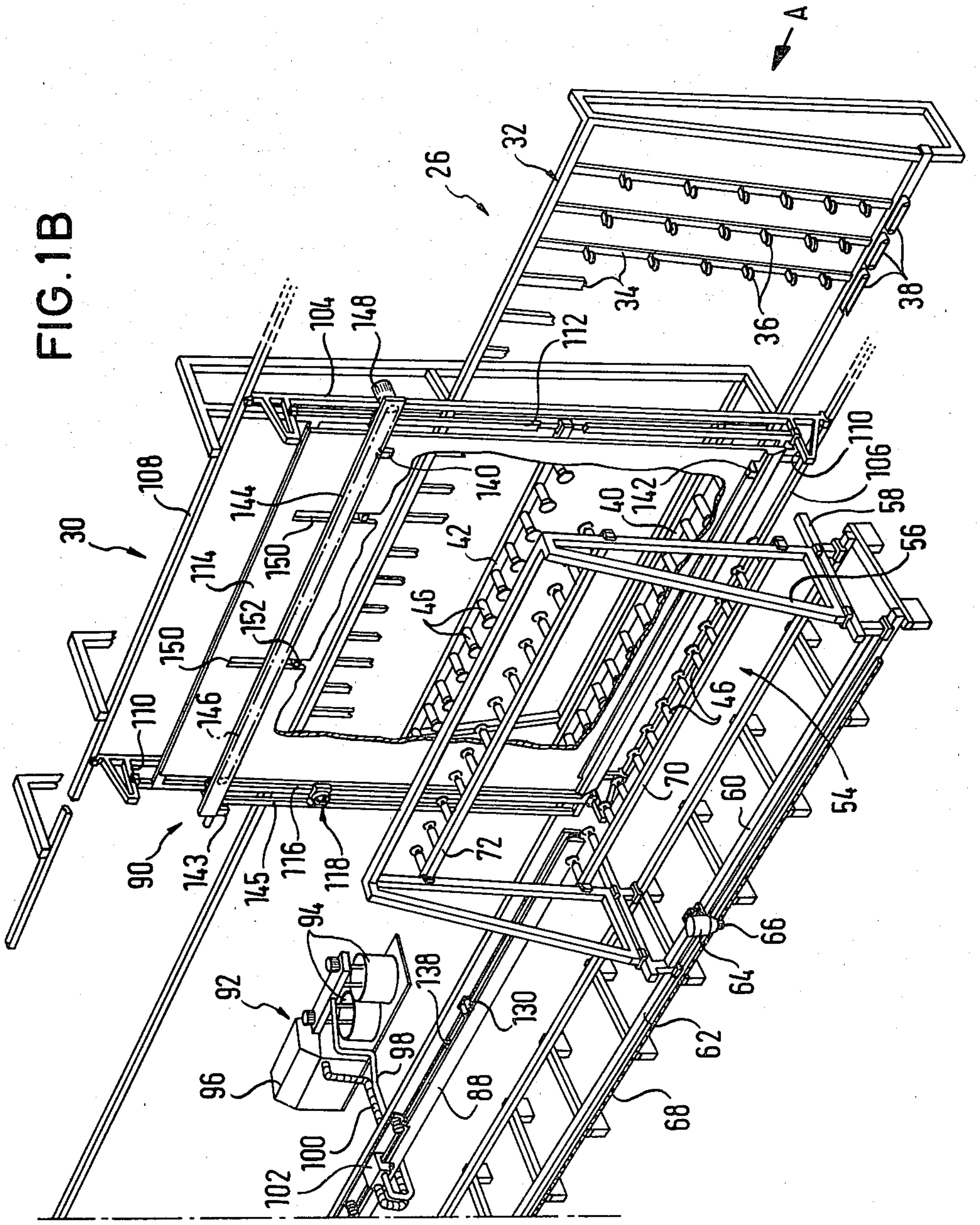

FIG.1A
FIG.9a
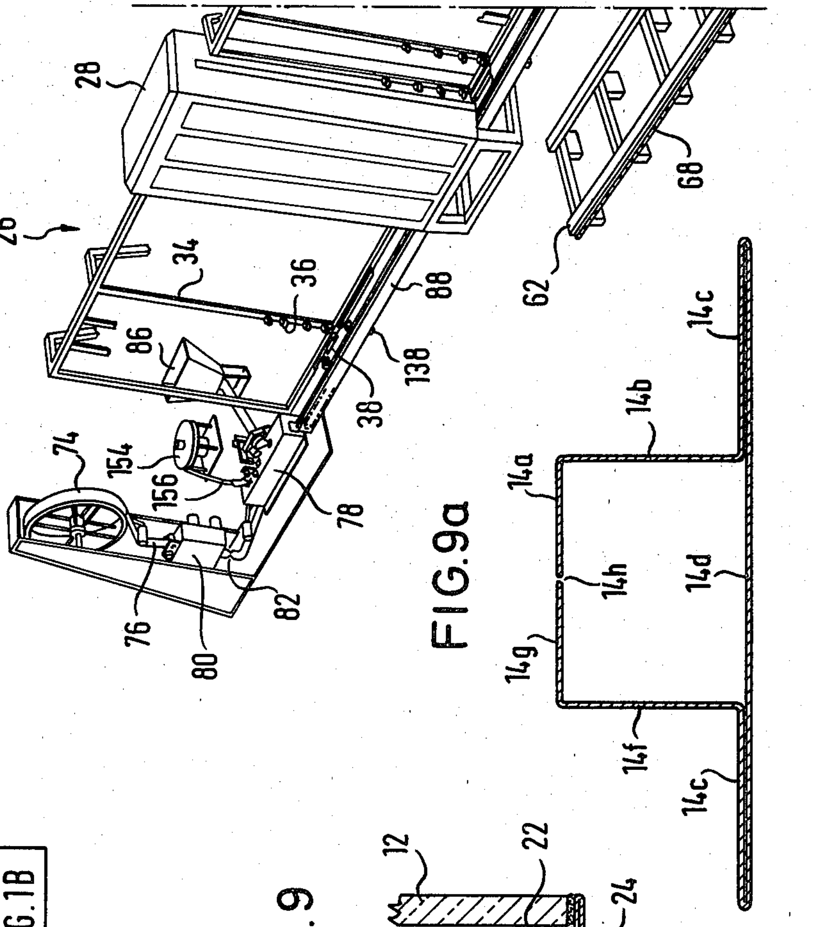
FIG.1
FIG.9
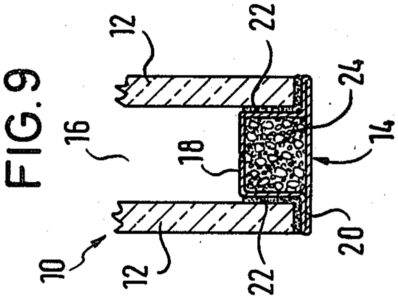

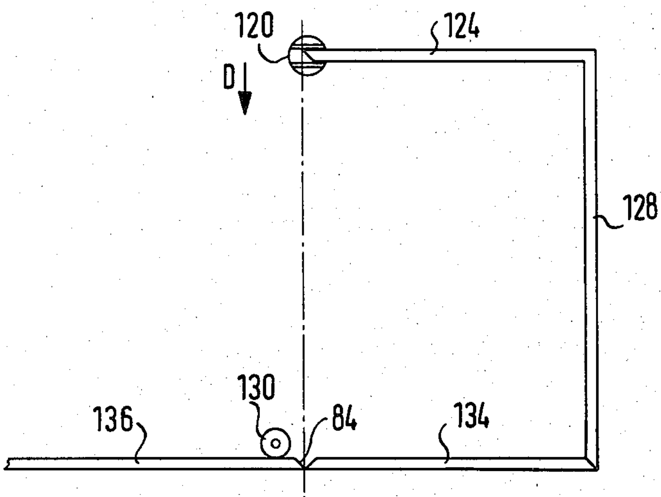
FIG. 6
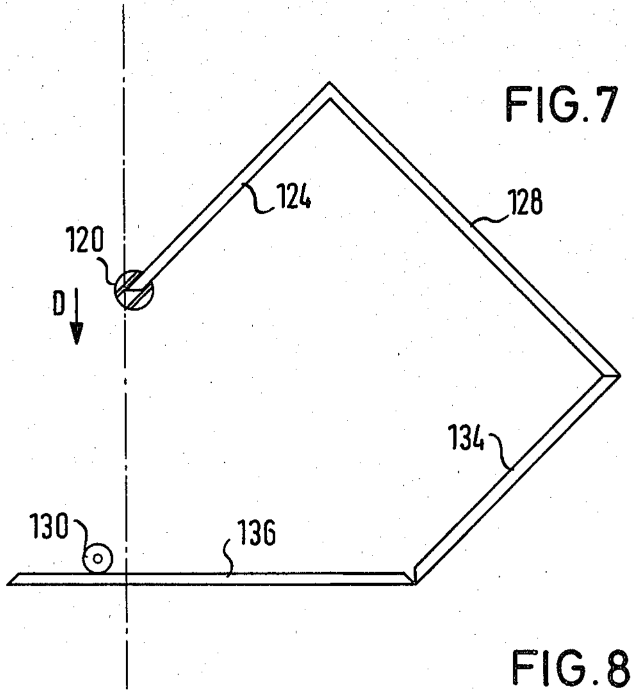
FIG. 7
FIG. 8
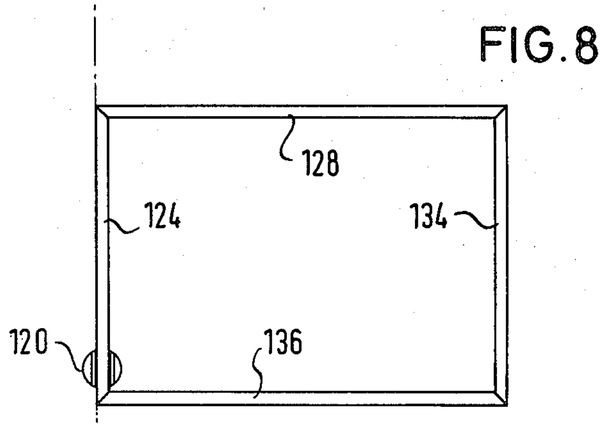

METHOD FOR THE PRODUCTION OF COMPOUND PLATES, PARTICULARLY COMPOUND GLASS PANES

The invention relates to a method for the production of compound plates, particularly compound glass panes, with at least two individual plates which are arranged parallel to one another and are held at a distance from one another and are connected to one another by means of a section which extends along the plate edges and engages between the individual plates.

At present, the production of compound plates of this type, such as compound glass panes, is relatively expensive and cumbersome. Conventionally, a first pane is initially placed horizontally on a support. Subsequently, a section frame composed of individual section pieces is coated with an adhesive and sealing agent and is placed on the first pane. The second pane is then placed on the section frame and the entire arrangement is pressed together.

This method has a number of disadvantages. First of all, the production can only be economical when a large number of compound glass panes with the same dimensions are to be produced because, otherwise, the section pieces for producing the section frame must be measured and cut individually for each pane. However, this means that incoming orders could possibly not be immediately met, because it is necessary to wait until an appropriate number of compound glass panes of equal size can be produced.

Particularly in the production of very large compound glass panes with edge lengths of several meters, the manipulation of the individual panes in the horizontal position is difficult and requires complicated arrangements and a lot of space. For example, the bottom one of the two individual panes must be stored in such a way that no scratches occur on the pane.

The invention is based on the task of providing a method for producing compound plates, particularly compound glass panes, which facilitates the production of compound plates of any size while requiring a work force as small as possible.

For solving this task, it is proposed in accordance with the invention that the individual plates are arranged, parallel and congruent in an essentially vertical position, at a distance from one another which is greater than the width of the section, that, in dependence on the size of the respective individual plates, a closed section frame is formed of a continuous section, wherein, prior to forming the section frame, miter recesses are provided in the section at the points which correspond to the intended frame corners, that the section frame is placed between the individual plates and is aligned with these plates, and that the individual plates and the section frame which is coated with an adhesive and sealing agent on the surfaces intended for the contact with the individual plates are pressed together and compressed.

The manipulation of the individual plates and the section frame is much simpler and requires less space in the vertical position than in the horizontal position. The vertical arrangement of the two individual plates and the section frame between the individual plates makes it possible to connect the individual plates and the section frame in one work step. The production of the section frame from a continuous section facilitates an economical manufacture of the section frame for compound plates of any size.

Preferably, the section is bent from a continuous metal strip by punching cuts which correspond to the miter recesses; this is done prior to or during the shaping of the section. Accordingly, the cuts are made in the metal strip at distances which correspond to the edge lengths of the plates to be processed.

The section is shaped, for example, with a T-shaped cross-section whose hollow base having an essentially rectangular cross-section is intended for the engagement between the individual panes and whose cross web is intended for the contact with the edge faces of the individual plates. The base of the T-section forms the spacer between the individual plates, while the cross web of the T-section forms the frame surrounding the individual plates. When the section is used for the production of compound glass panes, a moisture-absorbing material, such as silica gel, is advantageously filled into the hollow base of the T-section before the base is bent. This moisture-absorbing material has the purpose of absorbing the moisture contained in the air-tightly sealed space between the individual panes of the compound glass pane and to thereby prevent a fogging of the panes.

The section frame preferably is bent in such a way that the section provided with the miter recesses is continuously fed to a bending station, in which the leading end of the section is grasped by a driving means and is moved along a stationary guide during the feed of the section and perpendicularly of its feed direction in such a manner that a first section part located between the leading end and the next following miter recess is bent about an axis extending through the point of the miter recess until the edge faces of the adjoining section parts in the miter recess bear against each other, and that the feed motion of the section and the motion of the driving means are continued until the leading end of the first section part makes contact with the rearward end of a section part which is separated from the first section part by at least one second section part. Accordingly, if for instance a rectangular frame is produced, during the first bending step, the first section part is bent by 90° relative to the continuous section. Further bending is prevented by the adjoining edge faces of the miter recess. If the feed motion of the section is continued further, the second section part, while maintaining the right angle between the second section part and the first section part, is bent along an axis which is located in the point of the miter recess between the second and the third section parts. When the miter recess between the second and third section parts is closed, the third section part is bent together with the first and the second parts about an axis which is located in the point of miter recess between the third and the fourth section parts. When this miter recess is closed, the leading end of the first section part makes contact with the rearward end of the fourth section part and the section frame is closed. After cutting off the rearward end of the fourth section part from the continuous section, the section frame can be inserted between the panes. In connection with punching the miter recesses, this bending method facilitates a fully automatic and much more economical production of the section frame than in the past. It must be emphasized that this method can also be used for the production of section frames which do not serve for the production of compound plates or compound glass panes.

The adhesive and sealing material is preferably applied on the section prior to the forming of the section frame since, in this case, the continuous section must only pass along one stationary device for the application of adhesive.

The invention further relates to an arrangement for the production of compound plates with two individual plates which are arranged parallel and congruent at a distance from each other and are connected to each other by means of a spacer section extending along the plate edges, particularly for carrying out the above-described method.

In accordance with the invention, the arrangement comprises an upright conveyor for successively conveying the individual plates in an essentially vertical position in the direction toward an assembly station, a first device for grasping and holding the plates (hereinafter called the first plate manipulator) for receiving a first individual plate from the upright conveyor and for adjusting the first individual plate in an assembly position, a second device for grasping and holding the plates (hereinafter called the second plate manipulator) which is movable perpendicularly of the conveying direction of the upright conveyor and serves for receiving a second individual plate from the upright conveyor and for adjusting the second individual plate in a waiting position in which the second individual plate is arranged parallel and congruent with and at a distance from the first individual plate, this distance being greater than the mutual spacing of the individual plates in the compound plate, a device for shaping the section frame from a continuous section in dependence on the dimensions of the individual plates to be used for the assembly, and a frame supporting device for adjusting and releasably holding the shaped section frame in an assembly position in which the section frame is arranged between the individual plates parallel and congruent with the plates. When the two plate manipulators hold the individual plates in the assembly position and in the waiting position and when the section frame is in its assembly position, the two individual plates are connected to the section frame thereby that the second plate manipulator presses the second individual plate against a side of the section frame which is coated on both sides with adhesive and, after releasing the latter from the frame supporting device, presses the second individual plate together with the section frame against the first individual plate. As a result, workers do not have to touch the individual plates which may be very heavy. While requiring fewer workers, this has the additional advantage that, for example, the danger that the individual glass panes become dirty prior to their assembly is reduced. For example, prior to the production of the compound glass panes, a washing device for the individual panes may be arranged in front of the assembly station in the conveying path of the upright conveyor. After leaving the washing device, the individual panes do not have to be touched by workers prior to the assembly of a compound glass pane.

The upper conveyor may comprise, in a manner known per se, a roller lattice with a plurality of rollers which are freely rotatable about essentially vertical axes, and an essentially horizontal conveyor belt arranged at the bottom of the lattice. The individual plates are placed on edge on the horizontal conveyor belt and are supported by the roller lattice. For this purpose, the roller lattice and the conveyor belt preferably are slightly inclined relative to the vertical or the horizontal, so that the individual plates standing on the upright conveyor rest against the roller lattice under the influence of gravity.

To be able to hold individual plates of any size in the vertical position, the plate manipulators preferably are provided with a plurality of controllable suction cups which, in turn, are adjustable relative to one another, on the one hand, and synchronously together at least essentially in vertical direction, on the other hand. For example, each plate manipulator may comprise two rows of suction cups which are arranged on two horizontal, vertically adjustable supports which are arranged one above the other and are adjustable relative to each other and also synchronously together. The adjustment of the horizontal supports relative to each other facilitates the adjustment of the suction cups to various plate sizes. With a synchronous adjustment of the supports, the plates can be raised or lowered. The suction cups themselves can be actuated by means of a hydraulic or pneumatic actuating device for contact with the plates.

The second plate manipulator preferably is adjustable parallel to the conveying direction of the upright conveyor. In this manner, the second plate manipulator can lift the second individual plate from the upright conveyor and convey the plate into the waiting position when the first individual plate is already in the assembly position.

The mobility of the second plate manipulator perpendicularly and parallel to the conveying direction of the upright conveyor can be achieved, for example, by providing the second plate manipulator with a first frame on which the supports for the suction cups are vertically adjustably arranged and which is arranged on a second frame which is adjustable perpendicularly of the conveying direction of the upright conveyor, the second frame, in turn, being adjustable parallel to the conveying direction of the upright conveyor. The two frames can each be guided on rails and are adjustable by means of an adjusting drive.

In accordance with the invention, the device for shaping the section frame comprises a section shaping unit for shaping a continuous section of a metal strip, a punching device controlled in dependence on the dimensions of the individual plates to be processed for creating cuts in the metal strip at those locations which correspond to the intended corners of the section frame in such a manner that the cuts result in recesses corresponding to the miter cuts in the finished section frame, and a bending station for bending the section parts which are separated from each other by the miter recesses about axes extending in the miter recesses in order to obtain a closed section frame.

The punching device can be controlled either from a measuring device which measures the edge lengths of the individual plates placed on the upright conveyor, or the control can be effected by feeding the already known dimensions of the individual plates into a control device.

The section shaping unit is constructed in such a way that it is able to produce a hollow section having an essentially T-shaped cross-section. Section shaping devices for producing a hollow section from a metal strip are known per se, therefore, do not require a detailed description. To the section shaping unit there is advantageously assigned a filling device for filling in a moisture-absorbing agent prior to the closing of the hollow section. Between the section shaping unit and the bending station there is advantageously arranged a device for applying an adhesive and sealing material to the section surfaces intended for the contact with the individual plates. In this manner, the continuously passing section can easily be coated with the adhesive and sealing material by means of a roller or another application device.

To prevent sagging or buckling of the section between the section shaping unit and the bending station, a section guide extending essentially parallel to the conveying direction of the upright conveyor is arranged for the feed of the section from the section shaping device to the bending station.

In accordance with the invention, the bending station comprises a support wall directed essentially vertically and parallel to the section guide, a bending tool being assigned to the support wall. For example, on the vertical edge facing toward the section shaping unit, there is arranged, parallel to this edge and directed essentially perpendicularly of the section guide, a guide for a driving means for grasping and guiding the leading end of the continuous section, wherein the movement of the driving means is controllable in dependence on the feed speed of the continuous section in such a manner that the section parts are bent during the feed of the continuous section in the miter recesses of the section in the plane of the support wall. The support wall is also preferably slightly inclined relative to the vertical, so that the section frame obtained during the bending procedure rests against the support wall under the influence of gravity.

To avoid that, during bending the respective section part, the subsequent section part is also raised because of the stiffness of the material, the section guide is provided with a holding-down device which is movable parallel of the section guide and serves for pressing down the continuous section immediately behind that miter recess in which the continuous section is bent at the time.

The holding-down device preferably is connected to a feeler for sensing the miter recess; when the miter recess is closed, i.e. when the predetermined final angle between the two section parts is reached, this feeler releases the return of the holding-down device to a point behind the first following miter recess.

The support wall has the purpose of holding the section frame in a plane unit until it is connected to the second individual plate and adheres to this plate. Subsequently, the support wall must be removed, so that the section frame, and with it the second individual plate can be mounted on the first individual plate which is in its assembly position. For this purpose, the support wall is arranged so as to be adjustable parallel and perpendicularly of the conveying direction of the upright conveyor. By a slight motion perpendicularly of the conveying direction of the upright conveyor, the support wall can release the section frame and is then pulled out of the assembly station parallel to the conveying direction of the upright conveyor.

To hold the section frame on the support wall so that the section parts form the predetermined angles with each other, horizontally and vertically adjustable alignment stops are arranged on the support wall which bring the section frame into the desired position and hold it in this position. Preferably, two upper alignment stops are adjustably arranged on a horizontal rail which is arranged vertically adjustably in front of the support wall, so that the stops can be adjusted vertically as well as horizontally and, thereby, to different frame sizes.

Figure 2:
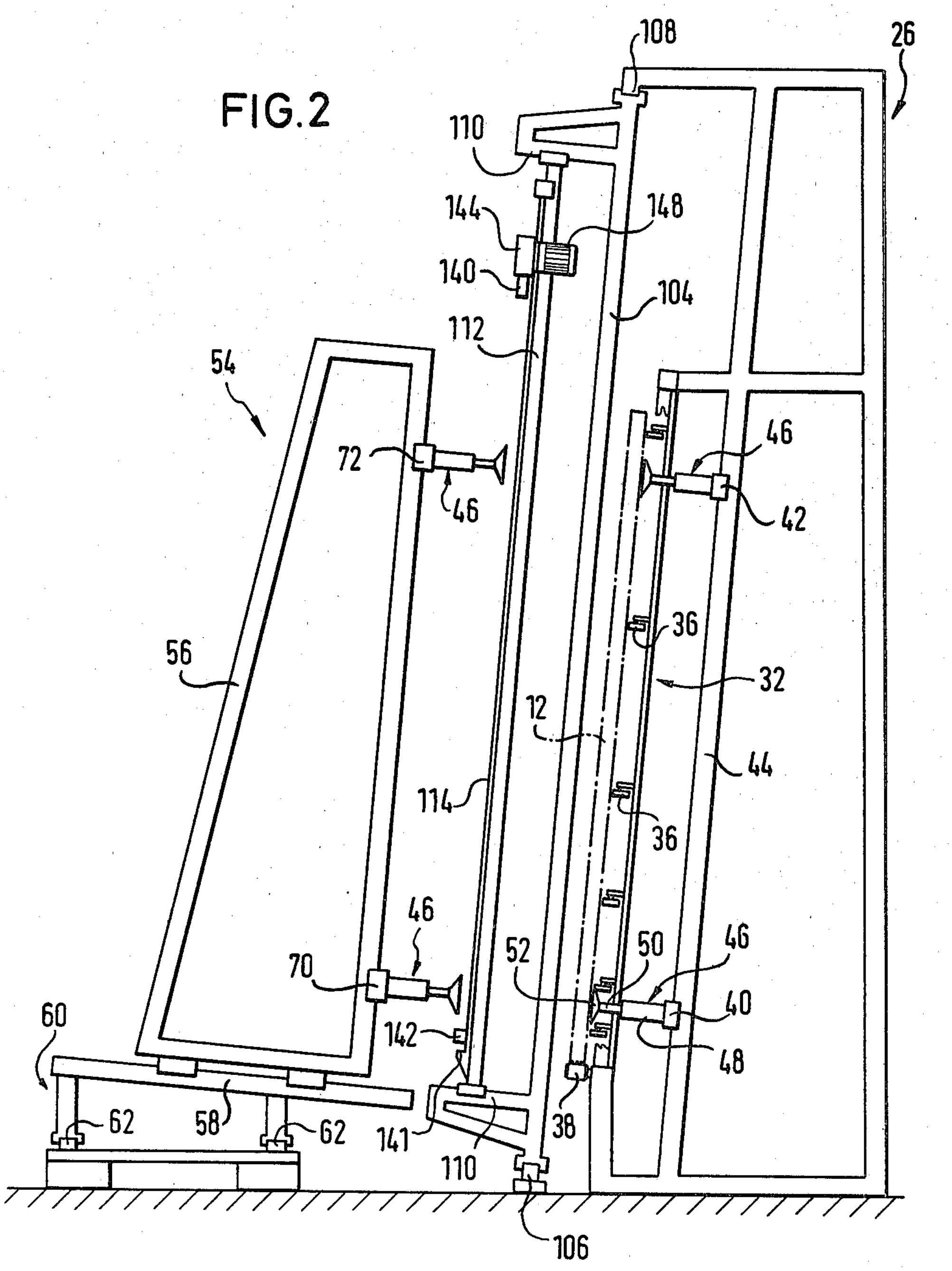
Figure 3:
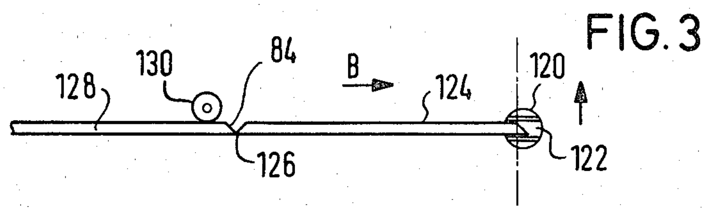

Additional advantages and features of the invention result from the following description which, in connection with the attached drawing, explains the invention with the aid of an embodiment. In the drawing:

FIG. 1 is made up of FIGS. 1A and 1B and shows a partially schematic, perspective view of a plant for the production of compound glass panes, FIG. 2 is a schematic end view in the direction of arrow A of FIG. 1, FIGS. 3 to 8 show the individual steps during the bending of a section frame from a continuous section which is provided with miter recesses, FIG. 9 is a schematic, partial view taken perpendicularly of the plane of the pane through the edge region of a compound glass pane, and FIG. 9*a* is an enlarged view of the section according to FIG. 9.

The arrangement illustrated in FIG. 1 serves for the production of compound glass panes 10 with two individual panes 12 (FIG. 9), the individual panes being arranged parallel to each other and being held at a distance from each other by means of a spacer section 14 extending along the pane edges, wherein the spacer section 14 simultaneously hermetically seals the space 16 between the individual panes 12. For this purpose, the spacer section, constructed as a hollow section with a T-shaped cross-section, is coated with an adhesive and sealing material 22 on the surfaces of the base 18 of the T-section intended for the contact with the individual panes 12 and on the surfaces of the cross web 20 of the T-section projecting beyond the base toward the left and the right. The individual panes 12 are tightly compressed with the spacer section 14, so that the desired seal of the space 16 is obtained. The hollow space 18 of the T-section is filled with a moisture-absorbing material 24, such as silica gel, which absorbs the moisture present in the space 16 during the assembly of the individual panes 12 and thereby prevents a later fogging of the inner sides of the individual panes 12.

The arrangement for the production of compound glass according to the invention comprises an upright conveyor 26 on which the cut-to-size individual panes are placed and are conveyed to an assembly station 30 through a washing device 28 arranged in the conveying path.

The upright conveyor 26 comprises a roller lattice 32 with a plurality of vertical struts 34 on which there are arranged a plurality of rollers 36 which are rotatable about vertical axes. At the bottom of the roller lattice 32, a plurality of driven conveyor belts, 38 are arranged in series, the conveyor belts 38 serving as the support and conveying device for the individual panes placed on the upright conveyor 26 and for the finished compound glass pane. The plane of the roller lattice 32 and the support plane of the conveyor belts 38 are slightly inclined, for example, by 5°, relative to the vertical and the horizontal, respectively, so that the panes standing on the upright conveyor 26 rest against the roller lattice 32 under the influence of gravity.

In the assembly station 30 there is arranged, on a structure connected to the roller lattice 32, a device for grasping, placing and holding a first individual pane in its assembly position. Hereinafter, this device is called the first plate manipulator. This manipulator comprises two essentially horizontally directed supports 40,42 which are arranged one above the other and are vertically adjustably guided at their longitudinal ends in vertical guides 44 and each carry a row of hydraulically or pneumatically actuated suction cups 46 which are arranged next to one another. The suction cups are each constructed with a cylinder 48 and a piston 50, a suction head 52 being arranged at the free end of the piston. By means of the piston-cylinder unit 48,50, the suction head 52 can be moved through the roller lattice 32 toward an individual plate 12 standing on the upright conveyor 26 in the assembly station 30 (see FIG. 2) and they can be actuated by means of a pneumatic or hydraulic actuating device, not shown, so that they are attached to the individual pane 12. By a slight, synchronous extension of the piston rods 50, the individual plate can be lifted from the roller lattice 32 and can be raised by a synchronous adjustment of the horizontal supports 42 and 40. By an adjustment of the supports 40 and 42 relative to each other, the first plate manipulator can be adjusted to the varying pane sizes.

Serving for grasping, placing and holding the second individual pane is a device, generally denoted by 54 and hereinafter called second plate manipulator. This manipulator comprises a first frame 56 which is adjustable on rails 58 perpendicularly of the conveying direction of the upright conveyor 26 by means of a drive arrangement, not shown. The rails 58 are part of a second frame 60 which is adjustable parallel to the upright conveyor 26 on rails 62 extending parallel to the conveying direction of the upright conveyor 26. The adjustment is effected by means of an electric motor 64 which is arranged on the second frame 60 and, on its output shaft, is provided with a pinion 66 which meshes with a rack 68 extending parallel to the adjusting direction.

On the first frame 56 there are arranged two supports 70 and 72 which correspond to the supports 40 and 42 of the first plate manipulator, are horizontally and vertically adjustable and, like the supports 40 and 42, each carry a row of suction cups 46. These suction cups 46 are constructed and actuated in the same manner as the above-described suction cups. Accordingly, equivalent parts are provided with the same reference numerals.

By means of the second plate manipulator 54, an individual pane standing in front of the assembly station 30 on the upright conveyor 26 can be raised from the upright conveyor 26 and can be conveyed into a waiting position in which the plate manipulator is in the position illustrated in FIG. 1B. For reasons of clarity, the individual panes are not illustrated in this figure.

FIGS. 1A and 1B further show a device for producing the spacer section 14. This device comprises a rotatably supported supply roll 74 for a metal strip 76 from which the spacer section 14 is produced by means of a section shaping device 78, for example, with a plurality of successively arranged shaping rollers. Before the metal strip 76 is shaped in the section shaping device 78 to a section of the shape illustrated in FIG. 9, cuts 82 are made in the metal strip 76 in a punching device 80, these cuts 82 having such a shape that the finished spacer section 14 emerging from the section shaping devices 78 has recesses in its base which correspond to the miter cuts 84 as they are illustrated in FIGS. 3 through 7. In the regions of the miter cuts 84, the section parts are connected on both sides of the miter cut 84 only through the cross web 20. The cuts can also be punched during the shaping of the section by means of a suitable device within the section shaping device.

The punching device 80 is controlled by a measuring device, not shown, which determines the edge lengths of the individual panes to be processed, so that the spacings of the cuts 82 in the metal strip 76 correspond to the edge lengths of the compound glass pane to be produced.

To the section shaping device 78 there is assigned a filling device 86 by means of which silica gel 24 can be filled into the hollow base 18 of the T-section before this is closed.

From the section shaping device 78 and underneath the washing device 28 there extends a section guide rail 88 parallel to the conveying direction of the upright conveyor 26 to a bending station, generally denoted by 90, in which bending of the section frame, schematically illustrated in FIG. 8, is performed from the continuous section. A device 92 for applying an adhesive and a sealing material can be seen between the washing device and the bending station 90. The device 92 has two reservoirs 94 for two components of a two-component adhesive and a reservoir 96 for a sealing material. The adhesive and the sealing material are conducted through lines 98 and 100 to an application head 102 which engages over the spacer section 14 guided on the guide rail 88 and applies the adhesive and the sealing material on the surfaces visible in FIG. 9.

The bending station 90 comprises a first frame 104 which is supported so as to be movable parallel to the conveying direction of the upright conveyor 26 on a lower rail 106 and an upper rail 108 extending parallel to the upright conveyor 26. The first frame 104 has four upper and lower rails 110 extending perpendicularly of the rails 106 and 108 between which a second, upright frame 112 is arranged so as to be movable perpendicularly of the conveying direction of the upright conveyor 26. The frame 112 is essentially covered by an upright support wall 114 which serves to support the section frame being created and whose center portion is broken out in FIG. 1B in order to make the horizontal supports 40 and 42 of the first plate manipulator visible.

On the vertical edge of the frame 112 on the left as seen in FIG. 1B, a guide 116 is arranged for a vertically raisable and lowerable driving means 118 whose function shall be explained in more detail in the following with the aid of FIGS. 3 to 8.

The section frame is bent from the continuously produced spacer section as follows: Initially, a continuous section emerging from the section shaping device 78 is advanced on the guide rail 88 until its leading end reaches the bending station 90 which, in this case, is arranged in the assembly station 30, as this is illustrated in FIG. 1B. The driving means 118 is moved into its lowermost position and a rotatable drive head 120, provided with a guide groove 122 for receiving the leading end of the section, is aligned in such a manner that the leading end of the section can enter the guide groove 122 (see FIG. 3). During the further feeding of the section in the direction of the arrow B in FIGS. 3 and 4, the driving means 118 is simultaneously moved upwardly on the driving means guide 116, wherein its speed is adjusted to the feeding speed of the section in such a way that the first section part 124 is bent upwardly about an axis which extends perpendicularly of the drawing plane of FIG. 3 through the point 126 of the first miter recess 84.

Figure 4:
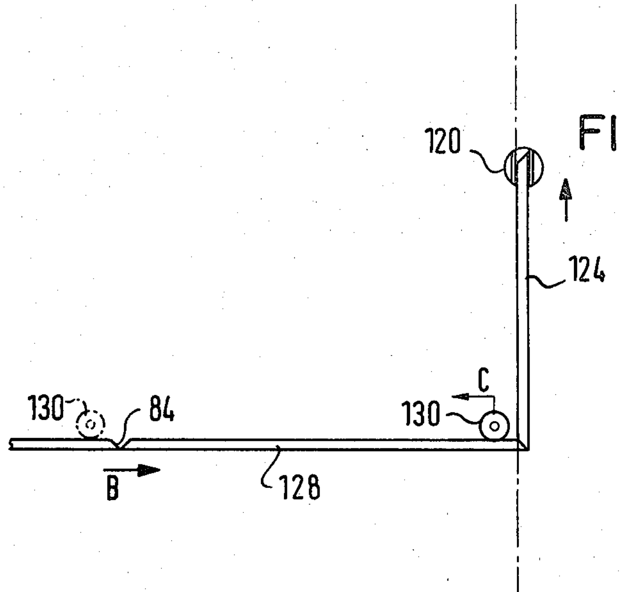

To ensure that bending actually takes place in the point 126 of the miter cut 84, and that the next following section part 128 is not also raised during the upward motion of the driving means 118, a holding-down roller 130 is arranged on the guide rail 88, the roller 130 being movable along the guide rail 88 and preventing the section from being raised from the guide rail 88. The holding-down roller 130 is adjusted to a position closely behind the first miter cut as seen in the direction of arrow B and travels together with the section until the position illustrated in FIG. 4 is reached in which the first and the second section parts 124 and 128 include a right angle and the miter cut 84 is closed. Subsequently, the holding-down roller travels from the position on the right illustrated in solid lines in FIG. 4 in the direction of arrow C into the position on the left illustrated by dash-dot lines behind the next miter cut 84. This return is controlled by means of a suitable control device.

Figure 5:
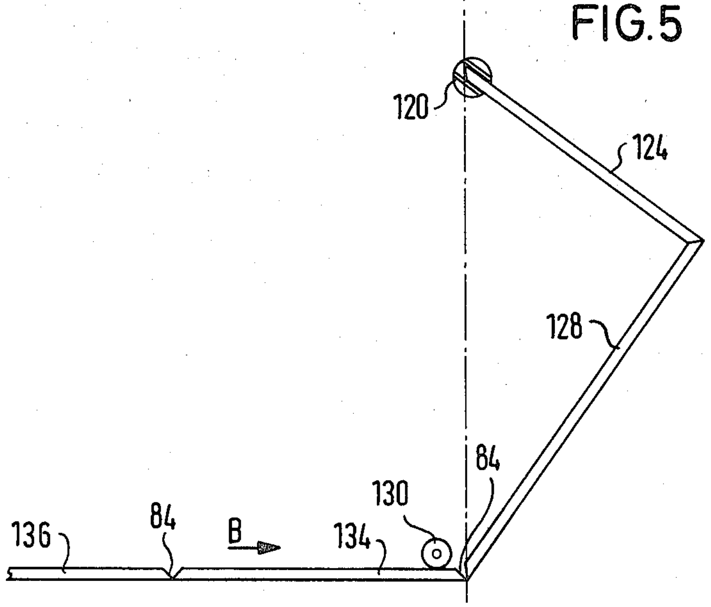

During the further feed of the section, the driving means 118 travels upwardly until the position illustrated in FIG. 5 is reached. In doing so, the first section part 124 and the second section part 128 are bent while maintaining the right angle between them about an axis which extends perpendicularly of the drawing plane through the point of the second miter cut 84. In FIG. 5, the highest point of the driving means 118 for the respective section frame is reached and, during the further feed of the section, the driving means 118 now travels downwardly in the direction of arrow D until the position illustrated in FIG. 6 is reached. During this time, the holding-down roller 130 remains in the position illustrated in FIG. 5. During the further feed of the continuous section and the further downward movement of the driving means 118, the first section part 124, the second section part 128 and the third section part 134 are jointly turned, while maintaining the angles between them, about an axis which extends perpendicularly of the drawing plane through the point of the third miter cut 84. This procedure corresponds to the transition from FIG. 6 through FIG. 7 to the illustration of FIG. 8 in which the finished section frame is shown.

Before the section frame is closed, the fourth section part 136 is cut by means of a cutting device, not shown, from the continuous section and is further advanced by means of a transport projection travelling on an endless chain in the guide rail 88.

In practice, the section frame, in all probability, does not have the ideal shape illustrated in FIG. 8, but is somewhat distorted in the manner of a parallelogram, so that it cannot yet be assembled with the individual panes. Serving for the straightening of the section frame are two upper alignment stops 140 and 143 and a lower alignment stop 142 which are movably arranged on the frame 112 of the bending station 90. The lower alignment stop 142 is movable only horizontally in the direction of the guide rail 88. The upper alignment stops 140 and 143 are arranged on a horizontally directed rail 144 so as to be horizontally adjustable in the direction of guide rail 88. The alignment stop 140 can be adjusted by means of a chain 146, illustrated in dash-dot lines, which is driven by an electric motor 148. An analogous adjusting device can be provided for the alignment stop 143. The rail 144, in turn, is vertically adjustably arranged with its two longitudinal ends on vertical guides of the frame 112. In this manner, the alignment stops 140 and 143 can be adjusted horizontally as well as vertically, so that they can be adjusted to any frame size.

To avoid that the section frame standing on a support surface 141 (FIG. 2) at the lower edge of the of the support wall 114 tilts toward the left in FIG. 1B out of the gripping range of the alignment stop 143, a stop ledge 145 extending parallel to the guide 116 is arranged on the frame 112.

Behind the support wall, there are further vertically adjustably arranged two stop projections 152 which extend through vertical slots 150 in the support wall and support the upper section part of the section frame in order to avoid sagging of the section part 128, particularly in the case of large section frames.

The arrangement illustrated in FIG. 1 operates as follows:

Initially, a first individual pane is placed on the left end of the upright conveyor 26 as seen in FIG. 1A. The individual pane travels through the washing device 28 and, by means of the upright conveyor 26, is moved into the assembly station 30 where it is grasped by the suction cups 46 of the first plate manipulator and is raised upwardly by the conveyor belts 36. Thus, the first individual plate is in its assembly position. The individual plate had been measured before entering the washing device. The data obtained from this measurement are supplied to a control for the punching device 80 which now punches the cuts 82 in the strip 76 which has been pulled off the roll 74 and is supplied to the section shaping device 78. Thus, a continuous section is produced whose miter cuts are positioned in such a way that a section frame can be bent which is suitable for the pane to be processed.

Simultaneously with the production of the section, the second individual pane is placed on the upright conveyor 26, travels through the washing device 28 and, in an intermediate position between the washing device 28 and the assembly station 30, is taken from the upright conveyor 26 with the use of the suction cups 46 by the second plate manipulator 54 which is now also in a position between the washing device 28 and the assembly station 30; the plate manipulator 54 transports the pane into a waiting position in which the pane is parallel and congruent to the first pane which is in its assembly position in the assembly station. As can be seen from FIG. 2, for this purpose, the frame 56 of the second plate manipulator is inclined relative to the vertical by the same extent as the roller lattice 32. In the manner described with the aid of FIGS. 3 to 8, the desired section frame is now bent from the continuous section. In doing so, the frame rests against the support wall 114 and, after bending is completed, is held by the alignment stops 140,143,142 and 152 in such a manner that the angles between the section parts coincide with the angles between the edges of the individual panes. The frame 56 now travels on the rail 58 in the direction toward the support wall 114 and presses the second individual pane into the section frame; this is done with such force that a preliminary adherence between the section frame and the second individual pane is obtained. Subsequently, the frame 112 is moved in the direction toward the upright conveyor 26 in order to separate the support wall and the alignment stops from the section frame. The bending station 90 with the frame 104 is now moved on the rails 106 and 108 parallel to the conveying direction of the upright conveyor 26 toward the left as seen in FIG. 1B, so that the path is clear for the second plate manipulator 54 and the second individual pane with the section frame can be pressed on the first individual pane. The panes connected in this manner are then again synchronously placed on the conveyor belts 38 by the two plate manipulators and are delivered on the upright conveyor 26 to a station, not shown, in which the panes are compressed.

It must be emphasized that, instead of compound glass panes, any other type of compound plates which are of similar construction can be produced by means of the arrangement according to the invention. Also, the arrangement for producing a section frame can be used independently from a mounting in the arrangement according to the invention.

It must be added that the hollow base 18 of the T-section must be closed at the miter cuts 84, before the silica gel is filled into the section part between always two miter cuts. This is done in the section shaping device 78 thereby that pieces of a foam material strip 156 supplied to the section shaping device 78 from a supply roll 154 are inserted in the region of the miter cuts 84 into the ends of the hollow section parts.

FIG. 9*a* shows the T-section according to FIG. 9 on a larger scale. This section is rolled from a single, flat strip of material, so that all the sides 14*a*, 14*b*, 14*c*, 14*d*, 14*e*, 14*f*, 14*g* are connected and the sides 14*a* and 14*g* abut at 14*h*.

We claim:

1. Method of producing compound plates, such as compound glass panes, including at least two individual plates disposed in spaced parallel relation opposite one another and a frame section located between and extending along the edges of the plates with the frame section connecting the plates together, wherein the improvement comprises that the formation of the frame includes the steps of removing a continuous elongated flat strip from a supply source and moving it to a bending station, bending the continuous flat strip in the bending station along bending lines extending in the elongated direction of the strip into the form of a continuous elongated hollow section, at least by the time the strip is located within the bending station forming miter cuts at locations spaced apart along the elongated direction of the strip with the miter cuts separating the continuous strip into connected subsections, determining the spacing between the cuts in correspondence to the long dimensions of the edges of the plates, mechanically bending in a substantially vertical plane the continuously connected subsections of the hollow section at the miter cuts by guiding the leading end of the hollow section within a vertical guide thereby forming the hollow section into a closed sided frame with the sides of the frame defined between adjacent miter cuts so that upon completion of the mechanical bending the closed sided frame lies in a substantially vertical plane in the region of an assembly station where the plates are to be combined with the completed frame to form the compound plates, separating the trailing end of the trailing subsection from the following continuous hollow section before closing the frame, and maintaining the closed frame at the assembly station and moving individual plates into alignment with the opposite faces of the frame and placing the plates into contact with the frame while the frame is maintained in an approximately vertical position.

2. Method, as set forth in claim 1, including the step of filling a moisture absorbing material into the hollow section forming the frame.

3. Method, as set forth in claim 2, including the step of inserting closing elements into said hollow section before forming the frame.

4. Method, as set forth in claim 2, wherein filling the hollow section with the moisture-absorbing material after the strip is bent to form the hollow section and before forming the hollow section into the frame.

5. Method, as set forth in claim 1, including the steps of measuring the edge lengths of the plates and supplying the measured lengths to a control device controlling the miter cuts for spacing the miter cuts apart corresponding to the edge lengths of the plates.

* * * * *